(12) United States Patent
Kim et al.

(10) Patent No.: US 11,424,467 B2
(45) Date of Patent: Aug. 23, 2022

(54) METHOD FOR MANUFACTURING MEMBRANE ELECTRODE ASSEMBLY, AND STACK

(71) Applicant: LG CHEM, LTD., Seoul (KR)

(72) Inventors: Doyoung Kim, Daejeon (KR); Woon Jo Kim, Daejeon (KR); Jooyong Park, Daejeon (KR); Ji Hun Kim, Daejeon (KR); Jae Choon Yang, Daejeon (KR); Sunghyun Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 226 days.

(21) Appl. No.: 16/644,667

(22) PCT Filed: Jan. 17, 2019

(86) PCT No.: PCT/KR2019/000700
§ 371 (c)(1),
(2) Date: Mar. 5, 2020

(87) PCT Pub. No.: WO2019/143148
PCT Pub. Date: Jul. 25, 2019

(65) Prior Publication Data
US 2021/0075048 A1    Mar. 11, 2021

(30) Foreign Application Priority Data

Jan. 22, 2018 (KR) .................. 10-2018-0007875

(51) Int. Cl.
*H01M 8/1004* (2016.01)
*H01M 8/0273* (2016.01)
*H01M 8/0286* (2016.01)

(52) U.S. Cl.
CPC ....... *H01M 8/1004* (2013.01); *H01M 8/0273* (2013.01); *H01M 8/0286* (2013.01)

(58) Field of Classification Search
CPC combination set(s) only.
See application file for complete search history.

(56) References Cited

U.S. PATENT DOCUMENTS

2007/0087259 A1   4/2007   Song et al.
2008/0142152 A1   6/2008   Debe et al.
(Continued)

FOREIGN PATENT DOCUMENTS

JP    2007265733         10/2007
JP    2007265733 A  *   10/2007
(Continued)

OTHER PUBLICATIONS

English translation of JP-2007265733-A (Year: 2007).*
International Search Report corresponding to PCT/KR2019/000700, dated Apr. 22, 2019 (6 pages including English translation).

*Primary Examiner* — Ula C Ruddock
*Assistant Examiner* — Sarika Gupta
(74) *Attorney, Agent, or Firm* — Myers Bigel, P.A.

(57) ABSTRACT

The present specification relates to a method for manufacturing a membrane electrode assembly and a laminate. Specifically, the present specification relates to a method for manufacturing a membrane electrode assembly including an anode, a cathode, and an electrolyte membrane provided between the anode and the cathode, and a laminate which is an intermediate laminated during the manufacture of the membrane electrode assembly.

12 Claims, 5 Drawing Sheets

(56) References Cited

U.S. PATENT DOCUMENTS

2016/0285120 A1   9/2016  Nakano et al.
2017/0012292 A1*  1/2017  Minegishi ........... H01M 8/0273

FOREIGN PATENT DOCUMENTS

| JP | 2011014403 A | 1/2011 |
|----|--------------|--------|
| JP | 2015164144   | 9/2015 |
| JP | 2016201219 A | 12/2016 |
| KR | 1020070041073 | 4/2007 |
| KR | 1020070045421 | 5/2007 |
| KR | 1020160033909 | 3/2016 |

* cited by examiner

METHOD FOR MANUFACTURING MEMBRANE ELECTRODE ASSEMBLY, AND STACK

CROSS REFERENCE TO RELATED APPLICATIONS

This application is a 35 U.S.C. § 371 national stage application of PCT International Application No. PCT/KR2019/000700, filed Jan. 17, 2019, which claims priority from Korean Patent Application No. 10-2018-0007875, filed Jan. 22, 2018, the contents of which are incorporated herein in their entireties by reference. The above-referenced PCT International Application was published in the Korean language as International Publication No. WO 2019/143148 on Jul. 25, 2019.

TECHNICAL FIELD

The present specification relates to a method for manufacturing a membrane electrode assembly and a laminate. Specifically, the present specification relates to a method for manufacturing a membrane electrode assembly including an anode, a cathode, and an electrolyte membrane provided between the anode and the cathode, and a laminate which is an intermediate laminated during the manufacture of the membrane electrode assembly.

BACKGROUND ART

Recently, as the depletion of existing energy resources such as petroleum or coal is expected, the need for energy capable of replacing these energy resources has been increasing, and as one of the alternative energies, interests in a fuel cell, a metal secondary battery, a flow battery, and the like have been focused.

As one of these alternative energies, a fuel cell has been actively studied because the fuel cell is highly efficient and does not discharge pollutants such as $NO_x$ and $SO_x$, and the fuel used is abundant.

FIG. 1 schematically illustrates an electricity generation principle of a fuel cell, and in a fuel cell, the most fundamental unit of generating electricity is a membrane electrode assembly (MEA), and the membrane electrode assembly is composed of an electrolyte membrane (M), and an anode (A) and a cathode (C) formed on both surfaces of the electrolyte membrane (M). Referring to FIG. 1 which illustrates an elasticity generation principle of a fuel cell, an oxidation reaction of fuel (F) such as hydrogen or a hydrocarbon such as methanol and butane occurs in the anode (A), and as a result, hydrogen ions ($H^+$) and electrons ($e^-$) are generated, and the hydrogen ions move to the cathode (C) through the electrolyte membrane (M). In the cathode (C), the hydrogen ions transferred through the electrolyte membrane (M), an oxidizing agent (O) such as oxygen, and electrons react to produce water (W). Electrons move to an external circuit by the reaction.

DETAILED DESCRIPTION OF INVENTION

Technical Problem

The present specification has been made in an effort to provide a method for manufacturing a membrane electrode assembly and a laminate. Specifically, the present specification has been made in an effort to provide a method for manufacturing a membrane electrode assembly including an anode, a cathode, and an electrolyte membrane provided between the anode and the cathode, and a laminate which is an intermediate laminated during the manufacture of the membrane electrode assembly.

Technical Solution

The present specification provides a method for manufacturing a membrane electrode assembly, the method including: manufacturing an electrode film by forming an electrode catalyst layer on a base material; manufacturing an edge seal film by forming a first adhesive layer on one surface of a protective film having an opening corresponding to an electrode active area of the electrode catalyst layer, and forming a second adhesive layer having a smaller adhesive strength than an adhesive strength of the first adhesive layer on the other surface thereof; manufacturing a laminate by attaching a surface of the edge seal film, on which the first adhesive layer is formed, to a surface of the electrode film, on which the electrode catalyst layer is formed, so as to face each other; preparing an electrolyte membrane; disposing the laminate on at least one surface of the electrolyte membrane such that the surface on which the second adhesive layer is formed faces the electrolyte membrane; heat-bonding the laminate at a temperature of 50° C. or more; and removing the base material and the first adhesive layer.

Further, the present specification provides a laminate including: a base material; an electrode catalyst layer provided on the base material; a protective film provided on the base material and having an opening corresponding to an electrode active area of the electrode catalyst layer; a first adhesive layer which is provided between the base material and the protective film and has an adhesive strength maintained or decreased at a temperature of 50° C. or more; and a second adhesive layer which is provided on the protective film and has an adhesive strength increased at a temperature of 50° C. or more, in which the adhesive strength of the first adhesive layer is smaller than the adhesive strength of the second adhesive layer.

Advantageous Effects

A method for manufacturing a membrane electrode assembly according to the present specification may enhance the convenience and accuracy of a process by first manufacturing a laminate in which an edge seal film and an electrode film are laminated, and manufacturing a membrane electrode assembly by only one-time thermal compression process using the laminate.

- 10: Electrode film
- 11: Electrode catalyst layer
- 12: Base material
- 20: Edge seal film
- 21: Second adhesive layer
- 22: Protective film
- 23: First adhesive layer
- 30: Laminate
- 40, 100: Electrolyte membrane
- 50: Membrane electrode assembly
- 60: Stack
- 70: Oxidizing agent supplying part
- 80: Fuel supplying part
- 81: Fuel tank
- 82: Pump
- 200: Cathode catalyst layer
- 210: Anode catalyst layer
- 400: Cathode gas diffusion layer
- 410: Anode gas diffusion layer
- 500: Cathode
- 510: Anode

BEST MODE

Hereinafter, the present specification will be described in detail.

[Method for Manufacturing Membrane Electrode Assembly]

Figure 6:
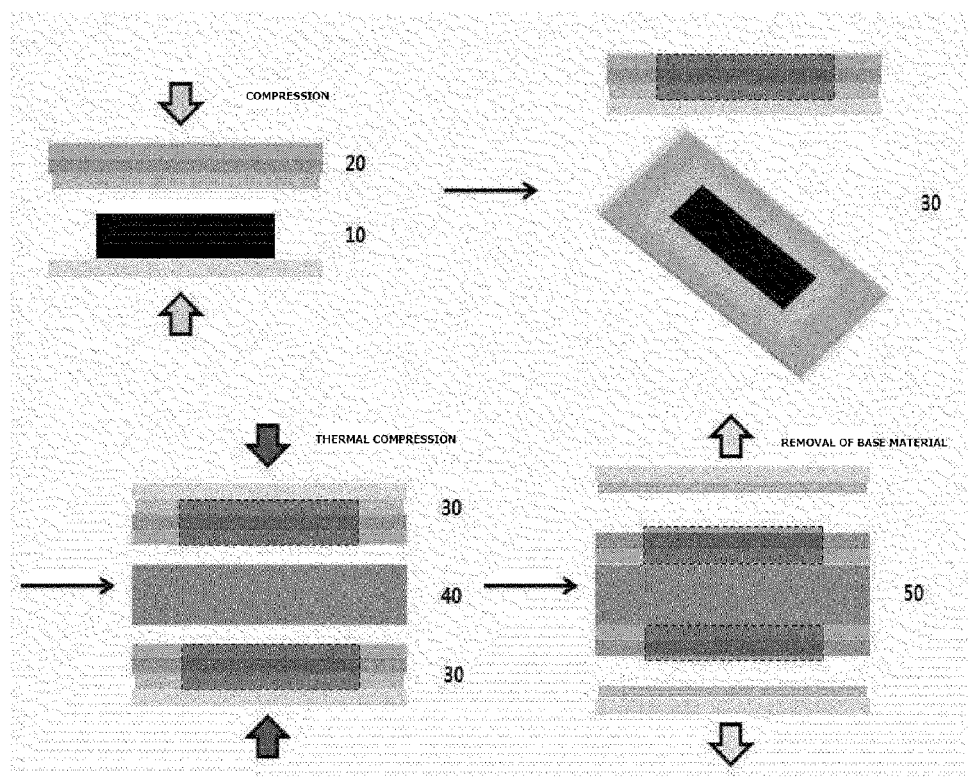
FIG. 6 is a view schematically illustrating a method for manufacturing a membrane electrode assembly according to the present specification.

The present specification provides a method for manufacturing a membrane electrode assembly, the method including: manufacturing an electrode film by forming an electrode catalyst layer on a base material; manufacturing an edge seal film by forming a first adhesive layer on one surface of a protective film having an opening corresponding to an electrode active area of the electrode catalyst layer, and forming a second adhesive layer having a smaller adhesive strength than an adhesive strength of the first adhesive layer on the other surface thereof; manufacturing a laminate by attaching a surface of the edge seal film, on which the first adhesive layer is formed, to a surface of the electrode film, on which the electrode catalyst layer is formed, so as to face each other; preparing an electrolyte membrane; disposing the laminate on at least one surface of the electrolyte membrane such that the surface on which the second adhesive layer is formed faces the electrolyte membrane; heat-bonding the laminate at a temperature of 50° C. or more; and removing the base material and the first adhesive layer. FIG. 6 illustrates a method for manufacturing a membrane electrode assembly according to the present specification.

[Manufacture of Electrode Film]

Figure 4:
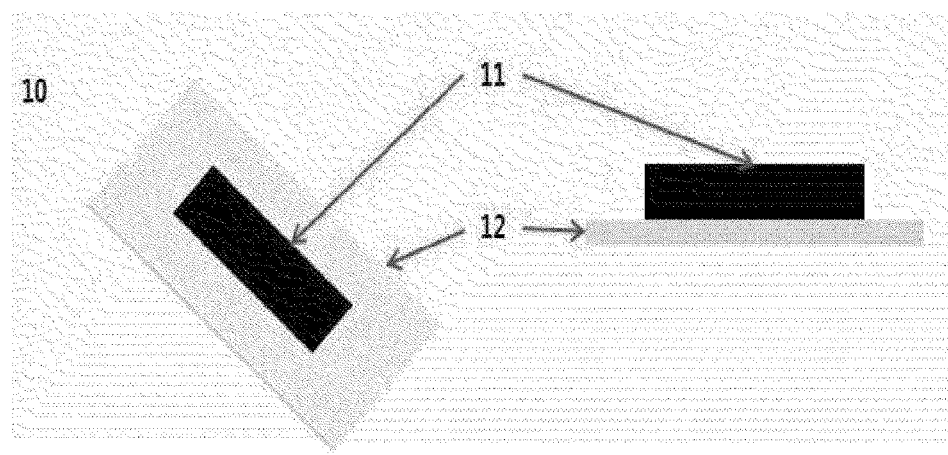
FIG. 4 is a view schematically illustrating an electrode film according to the present specification.

The method for manufacturing a membrane electrode assembly according to the present specification includes manufacturing an electrode film by forming an electrode catalyst layer on a base film. FIG. 4 illustrates an electrode film in which an electrode catalyst layer is formed on a base material.

A material for the base material is not particularly limited as long as the material may support an electrode catalyst layer to be formed on the base material and has good release performance during the transfer to an electrolyte membrane, but a typical base material used in the art may be adopted, and the material may be preferably a polytetrafluoroethylene (PTFE) sheet.

The electrode catalyst layer may be formed by using an electrode composition, a method of forming the electrode catalyst layer may be performed by a typical method known in the art, and for example, it is possible to use a method such as spray coating, tape casting, screen printing, blade coating, comma coating, or die coating.

The electrode composition may be variously applied according to the type and use of electrode catalyst layer, but the electrode composition may include a catalyst, a polymer ionomer, and a solvent.

The type of catalyst is not particularly limited, and a catalyst used in the art may be adopted. For example, the catalyst may include a metal particle selected from the group consisting of platinum, ruthenium, osmium, a platinum-ruthenium alloy, a platinum-osmium alloy, a platinum-palladium alloy, and a platinum-transition metal alloy. In this case, the metal particle may be a solid particle, a hollow metal particle, a bowl-type particle, a core-shell particle, or the like.

The catalysts may not only be used as they are, but also used while being supported on a carbon-based carrier.

As the carbon-based carrier, any one selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene ($C_{60}$), and Super P black, or a mixture of two or more thereof may be a preferred example as a carbon-based material.

As the polymer ionomer, a Nafion ionomer or a sulfonated polymer such as sulfonated polytrifluorostyrene may be representatively used.

The solvent is not particularly limited, and a solvent used in the art may be adopted. For example, as the solvent, any one selected from the group consisting of water, butanol, isopropanol, methanol, ethanol, n-propanol, n-butyl acetate, glycerol, and ethylene glycol, or a mixture of two or more thereof may be preferably used.

[Manufacture of Edge Seal Film]

The method for manufacturing a membrane electrode assembly according to the present specification includes manufacturing an edge seal film by forming a first adhesive layer on one surface of a protective film having an opening corresponding to an electrode active area of the electrode catalyst layer, and forming a second adhesive layer having a smaller adhesive strength than an adhesive strength of the first adhesive layer on the other surface thereof.

The opening corresponding to the electrode active area of the electrode catalyst layer means an opening having the same size as the electrode active area of the electrode catalyst layer, or an opening having a size of 90% to 110% of the electrode active area of the electrode catalyst layer.

The manufacturing of the edge seal film may include: preparing a protective film having an opening corresponding to the electrode active area of the electrode catalyst layer; forming a first adhesive layer, which has an adhesive strength maintained or decreased at a temperature of 50° C. or more, on one surface of the protective film; and forming a second adhesive layer, which has an adhesive strength increased at a temperature of 50° C. or more, on the other surface of the protective film.

In an exemplary embodiment of the present specification, as the protective film of the edge seal film, any one of PET, PE, PP, PEN, and PVC may be selected.

[Manufacture of First Adhesive Layer]

The first adhesive layer is provided partially or entirely on one surface of a protective film having an opening corresponding to an electrode active area of an electrode catalyst layer, and an adhesive strength thereof may be decreased at a temperature of 50° C. or more.

A portion or the entirety of the first adhesive layer may be brought into contact with and bonded to the base material of the electrode film, such that an edge seal film is fixed to the electrode film.

An adhesive strength of the first adhesive layer may be 30 gf/in to 500 gf/in at room temperature. In this case, the adhesive strength is a value measured by a peel test.

The first adhesive layer has an adhesive strength at room temperature, and as the temperature increases, the adhesive strength is gradually weakened, and the adhesive strength may be dropped to 100 gf/in or less at a temperature of 50° C. or more. The lower the adhesive strength is, the better the release performance is, so that the lower limit thereof is not particularly limited, but may be, for example, 10 gf/in or more.

[Manufacture of Second Adhesive Layer]

The second adhesive layer is provided on the other surface of a protective film having an opening corresponding to an electrode active area of an electrode catalyst layer, and an adhesive strength thereof may be increased at a temperature of 50° C. or more.

The second adhesive layer may be brought into contact with and bonded to an electrolyte membrane to be described below, such that a laminate is fixed to the electrolyte membrane.

An adhesive strength of the second adhesive layer may be 20 gf/in or less at room temperature, and an adhesive strength of the second adhesive layer may be 0 gf/in to 10 gf/in at room temperature.

The second adhesive layer scarcely has an adhesive strength at room temperature, and as the temperature increases, the adhesive strength thereof is increased, and may be increased to 500 gf/in or more at a temperature of 50° C. or more. The higher the adhesive strength is, the better the bonding property is, so that the upper limit thereof is not particularly limited, but may be, for example, 3,000 gf/in or less. The adhesive strength of the second adhesive layer may be 500 gf/in to 3,000 gf/in, specifically 500 gf/in to 2,000 gf/in at a temperature of 50° C. or more.

Figure 5:
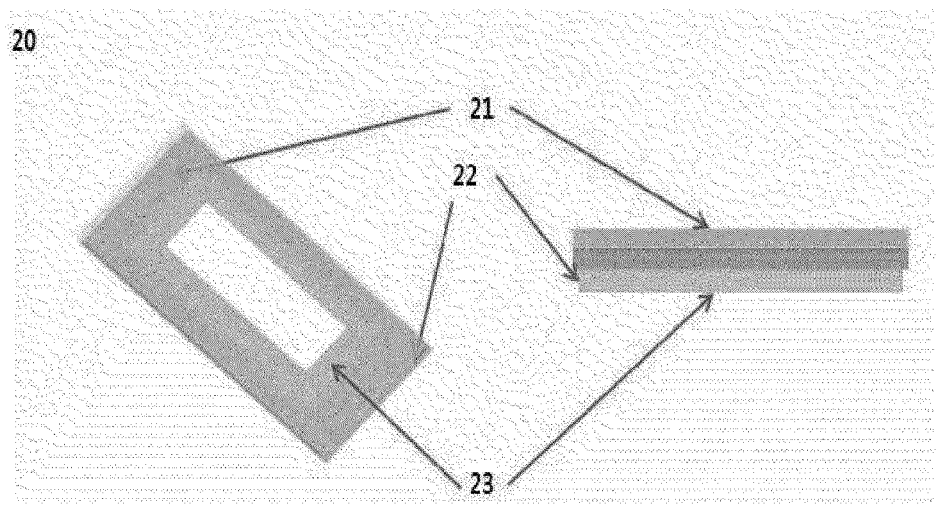
FIG. 5 is a view schematically illustrating an edge seal film according to the present specification.

The difference between the adhesive strength of the second adhesive layer at room temperature and the adhesive strength thereof at a temperature of 50° C. or more is 500 gf/in or more, and the larger the difference is, the better the bonding property is, so that the upper limit thereof is not particularly limited, but may be, for example, 3,000 gf/in or less. With respect to a component of the second adhesive layer, the adhesive strength begins to be increased at room temperature or more, the adhesive strength is increased or maintained at a temperature within a predetermined interval, and the adhesive strength is maintained specifically at a temperature of 50° C. to 200° C. FIG. 5 illustrates a structure of an edge seal film.

[Manufacture of Laminate]

The method for manufacturing a membrane electrode assembly according to the present specification may include manufacturing a laminate by attaching the edge seal film to the electrode film by the first adhesive layer.

The manufacturing of the laminate may be attaching the edge seal film to the electrode film by an adhesive strength of the first adhesive layer without applying heat thereto. Specifically, the manufacturing of the laminate may be attaching the edge seal film to the electrode film by the first adhesive layer by compressing the films with a pressure of 10 kgf/cm$^2$ to 50 kgf/cm$^2$.

Since an opening of a protective film is positioned in a region corresponding to an electrode active area of the electrode film, the manufacturing of the laminate may attach the edge seal film to the electrode film, such that the electrode active area is not covered by the protective film.

[Preparation of Electrolyte Membrane]

The method for manufacturing a membrane electrode assembly according to the present specification may include preparing an electrolyte membrane.

In the preparing of the electrolyte membrane, an electrolyte membrane manufactured outside may be purchased or an electrolyte membrane may be directly manufactured.

The electrolyte membrane may be a reinforced membrane which includes a polymer including an ion conductive polymer, and is manufactured by impregnating the ion conductive polymer in pores of a porous support, or a pure membrane which is manufactured by curing an ion conductive polymer without a porous support.

The ion conductive polymer is not particularly limited as long as the polymer is a material that can exchange ions, and those generally used in the art may be used.

The ion conductive polymer may be a hydrocarbon-based polymer, a partially fluorine-based polymer, or a fluorine-based polymer.

The hydrocarbon-based polymer may be a hydrocarbon-based sulfonated polymer having no fluorine group, and in contrast, the fluorine-based polymer may be a sulfonated polymer which is saturated with a fluorine group, and the partially fluorine-based polymer may be a sulfonated polymer which is not saturated with a fluorine group.

The ion conductive polymer may be one or two or more polymers selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyether ketone-based polymer, a polyetheretherketone-based polymer, a polyphenylquinoxaline-based polymer, a polysulfone-based polymer, a polypyrrole-based polymer, and a polyaniline-based polymer. The polymer may be sulfonated and used, and may be a single copolymer, an alternating copolymer, a random copolymer, a block copolymer, a multi-block copolymer, or a graft copolymer, but is not limited thereto.

The ion conductive polymer may be a polymer having cation conductivity, and may include at least one of, for example, a perfluorosulfonic acid-based polymer, sulfonated polyetheretherketone (sPEEK), sulfonated polyetherketone (sPEK), poly(vinylidene fluoride)-graft-poly(styrene sulfonic acid) (PVDF-g-PSSA), and sulfonated poly(fluorenyl ether ketone).

[Disposition of Laminate]

The method for manufacturing a membrane electrode assembly according to the present specification may include disposing the laminate on at least one surface of the electrolyte membrane such that the surface on which the second adhesive layer is formed faces the electrolyte membrane.

[Heat-Bonding Step]

The method for manufacturing a membrane electrode assembly according to the present specification may include heat-bonding the laminate at a temperature of 50° C. or more.

The heat-bonding applies heat at 50° C. or more and pressure to the entire surfaces of the laminate and the electrolyte membrane, so that the electrode catalyst layer of the laminate is transferred to the electrolyte membrane and the second adhesive layer of the laminate has an increased adhesive strength by heat, and as a result, the edge seal film of the laminate may be attached to the electrolyte membrane.

In the heat-bonding, the adhesive strength of the first adhesive layer, which has the adhesive strength decreased at a temperature of 50° C. or more, may be decreased.

[Removal of First Adhesive Layer]

The method for manufacturing a membrane electrode assembly according to the present specification may include removing the base material and the first adhesive layer.

It is possible to remove the first adhesive layer which has the adhesive strength decreased due to heat in the heat-bonding and the base material which is attached by the first adhesive layer.

[Laminate]

The present specification provides a laminate including: a base material; an electrode catalyst layer; a protective film; a first adhesive layer; and a second adhesive layer.

The description on the above-described method for manufacturing a membrane electrode assembly may be applied to the description on the laminate.

[Electrode Catalyst Layer]

The electrode catalyst layer may be provided on the base material.

The electrode catalyst layer may be used as at least one of a catalyst layer of an anode and a catalyst layer of a cathode, the oxidation reaction of fuel occurs in the catalyst layer of the anode, and the reduction reaction of an oxidizing agent occurs in the catalyst layer of the cathode.

In an exemplary embodiment of the present specification, each of the electrode catalyst layers may have a thickness of 3 µm to 30 µm. In this case, the thicknesses of the catalyst layer of the anode and the catalyst layer of the cathode may be the same as or different from each other.

[Protective Film]

The protective film may have an opening corresponding to an electrode active area of the electrode catalyst layer.

The electrode active area of the electrode catalyst layer means an area that may serve as an electrode while being exposed to fuel or an oxidizing agent without being covered by the protective film.

The electrode active area of the electrode catalyst layer may be a total area of the electrode catalyst layer, or may be smaller than the total area of the electrode catalyst layer.

When the electrode active area of the electrode catalyst layer is the same as the total area of the electrode catalyst layer, the size of the opening of the protective film is the same as the size of the electrode catalyst layer.

When the electrode active area of the electrode catalyst layer is smaller than the total area of the electrode catalyst layer, a portion of the area of the electrode catalyst layer may be covered by the protective film because the size of the opening of the protective film is smaller than the size of the electrode catalyst layer.

[First Adhesive Layer]

The first adhesive layer is provided between the base material and the protective film, and the adhesive strength thereof is decreased at a temperature of 50° C. or more.

The first adhesive layer may include at least one of nitrile rubber-based, silicone-based, acrylic-based, epoxy-based, and phenol-based components.

[Second Adhesive Layer]

The second adhesive layer is provided on the protective film, and the adhesive strength thereof is increased at a temperature of 50° C. or more.

The second adhesive layer includes at least one of nitrile rubber-based, silicone-based, acrylic-based, epoxy-based, and phenol-based components, and specifically, may include an epoxy-based or phenol-based component having a thermosetting property.

[Electrolyte Membrane]

The laminate according to the present specification may further include an electrolyte membrane provided on the second adhesive layer.

The laminate according to the present specification may include a first unit and a second unit. Specifically, the laminate according to the present specification may further include a first unit, a second unit, and an electrolyte membrane provided between the first unit and the second unit.

Further, each of the first unit and the second unit may include: a base material; an electrode catalyst layer provided on the base material; a protective film provided on the base material and having an opening corresponding to an electrode active area of the electrode catalyst layer; a first adhesive layer which is provided between the base material and the protective film and has an adhesive strength decreased at a temperature of 50° C. or more; and a second adhesive layer, which is provided on the protective film and has an adhesive strength increased at a temperature of 50° C. or more. In this case, the laminate according to the present specification may further include an electrolyte membrane provided between the second adhesive layer of the first unit and the second adhesive layer of the second unit.

[MEA/Cell]

The present specification provides an electrochemical cell including: an anode; a cathode; and an electrolyte membrane provided between the anode and the cathode, in which the electrochemical cell includes a membrane electrode assembly manufactured by the method for manufacturing a membrane electrode assembly.

The cathode means an electrode which receives electrons and is reduced when the cell is discharged, and may be an anode (oxidation electrode) which is oxidized and releases electrons when the cell is charged. The anode means an electrode which is oxidized and releases electrons when the cell is discharged, and may be a cathode (reduction electrode) which receives electrons and is reduced when the cell is charged.

The electrochemical cell means a cell which uses chemical reactions, and is not particularly limited in type as long as the cell includes a polymer electrolyte membrane, but for example, the electrochemical cell may be a fuel cell, a metal secondary cell, or a flow cell.

The present specification provides an electrochemical cell module including an electrochemical cell as a unit cell.

The electrochemical cell module may be formed by inserting a bipolar plate between unit cells according to one exemplary embodiment of the present application to stack the cells.

The cell module may be specifically used as a power source for an electric vehicle, a hybrid electric vehicle, a plug-in hybrid electric vehicle, or a power storage device.

The present specification provides a membrane electrode assembly manufactured by the method for manufacturing a membrane electrode assembly.

The present specification provides a fuel cell including the membrane electrode assembly.

Figure 1:
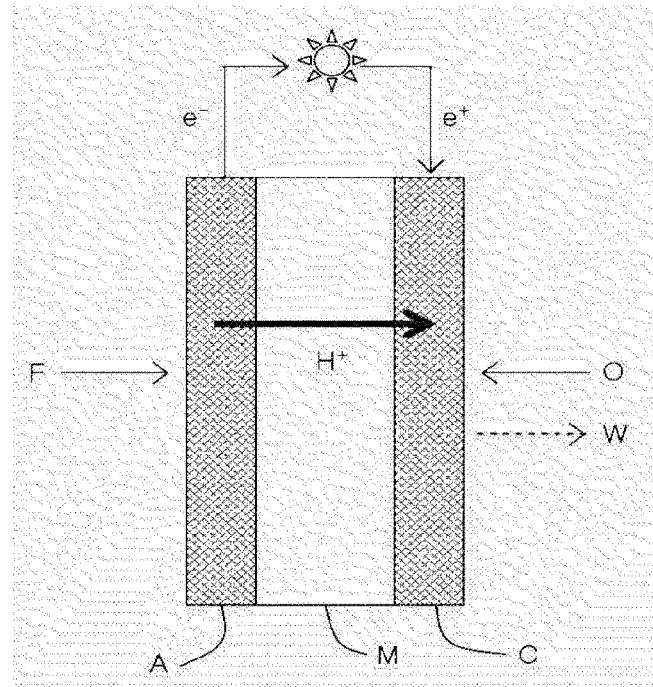
FIG. 1 is a schematic view illustrating an electricity generation principle of a fuel cell.
Figure 2:
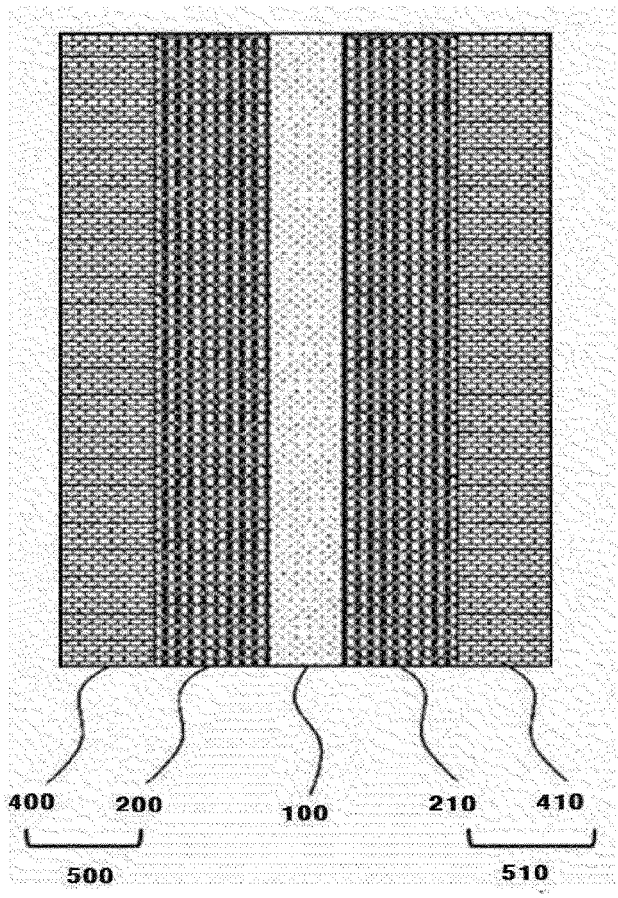
FIG. 2 is a view schematically illustrating a structure of a membrane electrode assembly for a fuel cell.

FIG. 2 schematically illustrates a structure of a membrane electrode assembly for a fuel cell, and the membrane electrode assembly for a fuel cell may include an electrolyte membrane 10, and a cathode 50 and an anode 51 facing each other with the electrolyte membrane 10 interposed therebetween. In the cathode, a cathode catalyst layer 20 and a cathode gas diffusion layer 40 may be provided sequentially from the electrolyte membrane 10, and in the anode, an anode catalyst layer 21 and an anode gas diffusion layer 41 may be provided sequentially from the electrolyte membrane 10.

Figure 3:
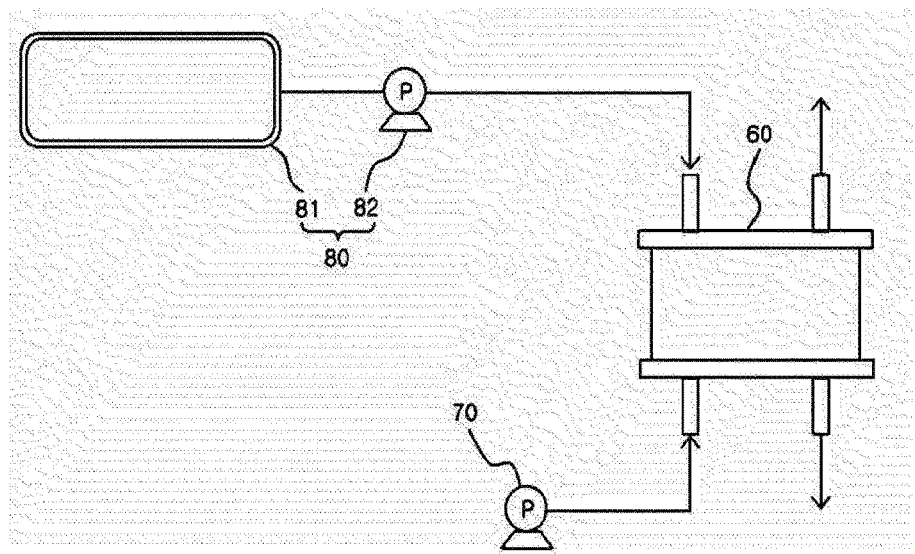
FIG. 3 is a view schematically illustrating an example of a fuel cell.

FIG. 3 schematically illustrates a structure of a fuel cell, and the fuel cell includes a stack 60, an oxidizing agent supplying part 70, and a fuel supplying part 80.

The stack 60 includes the above-described one membrane electrode assembly or two or more membrane electrode assemblies, and when two or more membrane electrode assemblies are included, the stack 60 includes a separator interposed therebetween. The separator serves to prevent the membrane electrode assemblies from being electrically connected to each other, and to transfer fuel and an oxidizing agent, which are supplied from the outside, to the membrane electrode assemblies.

The oxidizing agent supplying part 70 serves to supply an oxidizing agent to the stack 60. As the oxidizing agent, oxygen is representatively used, and oxygen or air may be used by being injected into the oxidizing agent supplying part 70.

The fuel supplying part 80 serves to supply fuel to the stack 60, and may be composed of a fuel tank 81 which stores fuel, and a pump 82 which supplies the stack 60 with fuel stored in the fuel tank 81. As the fuel, hydrogen or hydrocarbon fuel in a gas or liquid state may be used. Examples of the hydrocarbon fuel may include methanol, ethanol, propanol, butanol, or natural gases.

MODE FOR INVENTION

Hereinafter, the present specification will be described in more detail through Examples. However, the following Examples are provided only for exemplifying the present specification, but are not intended to limit the present specification.

EXAMPLES

Example 1

[Edge Seal Film]

An edge seal film was manufactured by compressing a surface opposite to an adhesive surface of a heat bonding film containing a phenol resin and the like with a pressure of about 10 kgf/cm$^2$ using an acrylic resin-based double-sided adhesive tape.

As the heat bonding film, a PET-material heat bonding film manufactured by Daehyun ST Co., Ltd. was used, and as the acrylic resin-based double-sided adhesive tape, a 3M 4910 double-sided tape of an acrylic adhesive layer was used.

[Electrode Film]

A catalyst slurry was manufactured by adding a platinum-supported carbon catalyst (Pt/C) to a Nafion solution, 1-propyl alcohol, and small amounts of water and glycol and stirring the resulting mixture at a high rate. A weight ratio of the platinum-supported carbon catalyst (Pt/C), the 20% Nafion solution, 1-propyl alcohol, water, and glycol in the catalyst slurry was 1:2:10:1:1.

The catalyst slurry was coated onto a polytetrafluoroethylene (PTFE) sheet by using an inkjet coater. In this case, the coating amount is a Pt weight after the drying, and 0.4 mg/cm$^2$ of Pt was coated.

After the catalyst slurry was coated, an electrode film was formed by curing the coated catalyst slurry at 35° C. for 30 minutes and 100° C. for 1 hour, and drying the coated catalyst slurry.

[Laminate]

A laminate was formed by bringing the electrode catalyst layer of the manufactured electrode film into contact with the surface of the first adhesive layer of the above-described edge seal film and compressing the contacted layers with a pressure of 10 kgf/cm$^2$ for 1 to 2 seconds. Through the compression, the first adhesive layer was brought into contact with the base material of the electrode catalyst layer.

[Membrane Electrode Assembly]

In the laminate, the second adhesive layer and the electrolyte membrane were disposed so as to be brought into contact with each other and thermally compressed at 130° C. and 120 kgf/cm$^2$ for 5 minutes, and a membrane electrode assembly was finally manufactured by removing the first adhesive layer and the base material attached by the first adhesive layer through a mechanical peeling method.

Comparative Example 1

An electrode film was manufactured by the same method as in Example 1.

The electrolyte membrane and the heat bonding film used in Example 1 was disposed and thermally compressed at 80° C. for 10 seconds. A membrane electrode assembly was manufactured by disposing the electrode film in the manufactured electrolyte membrane-heat bonding film assembly and thermally compressing the assembly at 130° C. and 120 kgf/cm$^2$ for 5 minutes.

Comparative Example 2

The electrolyte membrane and the heat bonding film used in Example 1 were disposed and thermally compressed at 80° C. for 10 seconds. The catalyst slurry in Example 1 was manufactured and then directly coated onto the manufactured electrolyte membrane-heat bonding film assembly. In this case, the coating amount is a Pt weight after the drying, and 0.4 mg/cm$^2$ of Pt was coated.

Experimental Example 1

Figure 7:
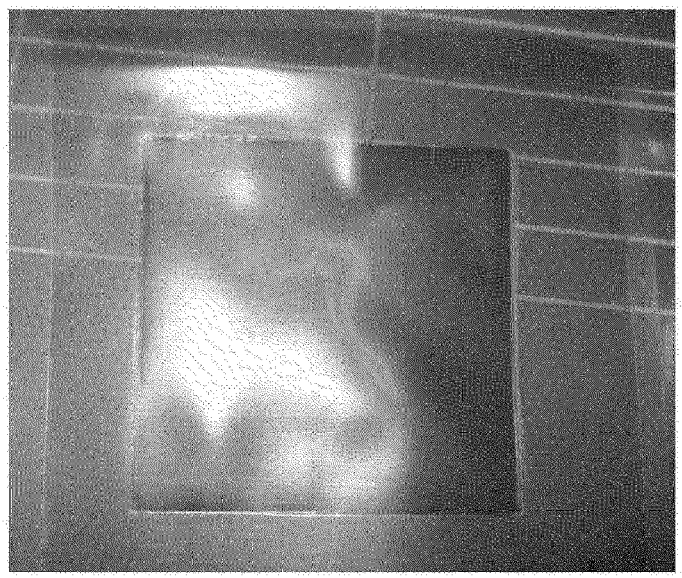
FIG. 7 is a view illustrating an electrolyte membrane of a membrane electrode assembly manufactured according to Example 1.
Figure 8:
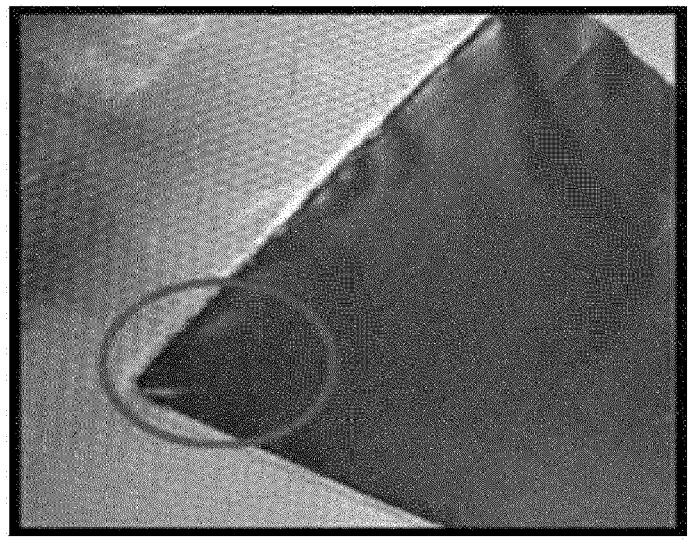
FIG. 8 is a view illustrating an electrolyte membrane of a membrane electrode assembly manufactured according to Comparative Example 1.
Figure 9:
FIG. 9 is a view illustrating an electrolyte membrane of a membrane electrode assembly manufactured according to Comparative Example 2.

Photographs were captured in order to compare the degree of damage of the electrolyte membranes of the membrane electrode assemblies manufactured according to Example 1, and Comparative Examples 1 and 2, and the photographs are illustrated in FIG. 7 (Example 1), FIG. 8 (Comparative Example 1), and FIG. 9 (Comparative Example 2).

It could be confirmed that the electrolyte membrane of the membrane electrode assembly according to Example 1 had a stable active area, but it could be confirmed that the transfer of the active areas of the electrolyte membranes of the membrane electrode assemblies according to Comparative Examples 1 and 2 was unstable.

What is claimed is:

1. A method for manufacturing a membrane electrode assembly, the method comprising:
manufacturing an electrode film by forming an electrode catalyst layer on a first surface of a base material;
manufacturing an edge seal film by forming a first adhesive layer on a first surface of a protective film that comprises an opening corresponding to an electrode active area of the electrode catalyst layer and forming a second adhesive layer on a second surface of the protective film, wherein the second surface of the protective film is opposite the first surface thereof, and the second adhesive layer has an adhesive strength weaker than an adhesive strength of the first adhesive layer at room temperature;
manufacturing a laminate by attaching the first adhesive layer of the edge seal film to the electrode film, wherein the first surface of the base material faces the edge seal film;
providing the laminate on an electrolyte membrane, wherein the second adhesive layer extends between the protective film and the electrolyte membrane;
heat-bonding the laminate to the electrolyte membrane at a temperature in a range of from 50° C. to 200° C.; and then
removing the base material and the first adhesive layer.

2. The method of claim 1, wherein the manufacturing of the laminate comprises compressing the electrode film and the edge seal film together with a pressure of 10 kgf/cm$^2$ to 50 kgf/cm$^2$.

3. The method of claim 1, wherein the adhesive strength of the first adhesive layer is maintained or decreases as a temperature increases toward 50° C. or higher, and the adhesive strength of the second adhesive layer increases as the temperature increases toward 50° C. or higher.

4. A laminate comprising at least one laminate unit comprising:
a base material;
an electrode catalyst layer on the base material;
a protective film on the base material and comprising an opening corresponding to an electrode active area of the electrode catalyst layer;
a first adhesive layer that extends between the base material and the protective film and has an adhesive strength that is maintained or decreases as a temperature increases toward 50° C. or higher; and
a second adhesive layer that extends on the protective film and has an adhesive strength that increases as the temperature increases toward 50° C. or higher,
wherein the adhesive strength of the first adhesive layer is weaker than the adhesive strength of the second adhesive layer at the temperature of 50° C. or higher.

5. The laminate of claim 4, further comprising: an electrolyte membrane on the second adhesive layer.

6. The laminate of claim 4, wherein the at least one laminate unit comprises a first laminate unit and a second laminate unit, and
wherein the laminate further comprises an electrolyte membrane between the second adhesive layer of the first laminate unit and the second adhesive layer of the second laminate unit.

7. The laminate of claim 6, wherein the first adhesive layer comprises at least one of nitrile rubber-based, silicone-based, acrylic-based, epoxy-based, and phenol-based components.

8. The laminate of claim 5, wherein the second adhesive layer extends between the protective film and the electrolyte membrane.

9. The method of claim 3, wherein the adhesive strength of the first adhesive layer is weaker than the adhesive strength of the second adhesive layer at the temperature of 50° C. or higher.

10. The method of claim 9, wherein the adhesive strength of the first adhesive layer is 100 gf/in or less at the temperature of 50° C. or higher.

11. The method of claim 10, wherein the adhesive strength of the second adhesive layer is 500 gf/in or greater at the temperature of 50° C. or higher.

12. The method of claim 1, wherein heat-bonding the laminate to the electrolyte membrane is performed at the temperature in a range of from 50° C. to 130° C.

* * * * *